United States Patent [19]

Snook, Jr.

[11] Patent Number: 5,518,017
[45] Date of Patent: May 21, 1996

[54] FUEL TANK

[75] Inventor: William N. Snook, Jr., Orlando, Fla.

[73] Assignee: Correct Craft, Inc., Orlando, Fla.

[21] Appl. No.: 246,708

[22] Filed: May 20, 1994

[51] Int. Cl.⁶ .................................................. E03B 11/00
[52] U.S. Cl. ................ 137/38; 137/575; 137/576; 137/577; 137/590
[58] Field of Search ........................ 137/576, 577, 137/590, 38, 575

[56] References Cited

U.S. PATENT DOCUMENTS

| | | | |
|---|---|---|---|
| 931,071 | 8/1909 | Livingston | 137/577 |
| 2,112,393 | 3/1938 | Burch et al. | 137/577 |
| 2,136,593 | 11/1938 | McLaughlin | 137/575 |
| 2,329,845 | 9/1943 | Lindsay | 137/38 |
| 2,389,168 | 11/1945 | Snyder . | |
| 4,261,378 | 4/1981 | Otzen | 137/577 |
| 4,354,521 | 10/1982 | Harde . | |
| 4,453,564 | 6/1984 | Bergesio . | |
| 4,989,572 | 2/1991 | Giacomazzi et al. | 137/576 |
| 5,127,432 | 7/1992 | Duhaime et al. . | |
| 5,221,021 | 6/1993 | Danna . | |
| 5,297,578 | 3/1994 | Scott et al. | 137/590 |

Primary Examiner—A. Michael Chambers
Attorney, Agent, or Firm—Jacobson, Price, Holman & Stern

[57] ABSTRACT

A marine fuel tank includes a "sump" tank compartment. The sump tank compartment projects from and below a main fuel tank compartment. A bottom cover plate, covering the sump, has a large hole in its center in communication with one end of a connection tube. The bottom cover plate for the sump also includes two small holes directly in front of and behind the connection tube, aligned with each other in a direction of travel. These holes allow fuel to move from the main fuel tank compartment of the fuel tank into the sump tank compartment. As the main fuel tank compartment is filled with fuel, the fuel flows to the sump tank compartment by gravity feed through the holes in the cover plate of the sump tank compartment. A fuel pickup tube extends through the connection tube and into the sump tank compartment and its free end is free to move inside the sump tank compartment as moved by the dynamic acceleration forces acting on the fuel pickup tube.

19 Claims, 3 Drawing Sheets

FUEL TANK

FIELD OF THE INVENTION

This invention relates to the field of fuel tanks for marine vehicles which have a tendency to have fuel slosh in the tank from side to side during travel.

BACKGROUND OF THE INVENTION

Various types of fuel tank arrangements have been proposed for motorized vehicles. For example, U.S. Pat. No. 4,354,521 to Harde discloses a device in a fuel tank for motor vehicles which, if the fuel level is low when driving on an inclined surface, retains a required amount of fuel around the fuel line opening to prevent air intake.

U.S. Pat. No. 4,453,564 to Bergesio discloses a fuel tank for motor vehicles with a fuel feed pipe for connection to a fuel supply system of a motor vehicle engine and includes an inner wall extending between the lower wall and the upper wall of the tank which surrounds the fuel feed pipe to define a chamber having a smaller capacity than the capacity of the tank.

U.S. Pat. No. 5,127,432 to Duhaime et al. discloses a fuel tank having an upstanding wall on the fuel tank bottom. The wall forms a reservoir area for containing fuel. A passage within the wall has a throat area for admitting fuel to the reservoir. A baffle attached to the wall is placed adjacent the throat area and deflects fuel away from the passage.

U.S. Pat. No. 5,221,021 to Danna discloses a fuel tank with first and second fuel tank walls having a reservoir therebetween. The reservoir has a resilient portion which biases the reservoir in place against the first and second fuel tank walls. The reservoir is held securely in position without the need for mechanical fasteners.

U.S. Pat. No. 2,389,168 to Snyder discloses a means for storing liquid fuel which is used as auxiliary tanks for carrying increased quantities of fuel.

With the advent of fuel-injected marine engines, a need exists to maintain a level of fuel at a fuel pickup, even when the dynamic acceleration forces of a marine vehicle cause the main body of fuel in a fuel tank to move away from the fuel pickup.

SUMMARY OF THE INVENTION

To overcome the problem with respect to acceleration forces moving fuel away from a fuel pickup, the present invention includes a marine fuel tank having a molded, or in the case of an aluminum tank, a fabricated "sump" tank compartment. The sump tank compartment projects from and below the main fuel tank compartment. The sump tank compartment is sealed via an O-ring gasket with a flat cover plate that is attached to a top mounting plate for the main fuel tank compartment by a hollow interconnecting tube.

The bottom cover plate, covering the sump tank compartment, has a large hole in its center in communication with one end of the interconnecting tube. The bottom cover plate for the sump tank compartment also includes two small holes directly in front of and behind the interconnecting tube, aligned with each other in a straight, forward direction of travel of a marine vehicle. These holes allow fuel to move from the main fuel tank compartment of the fuel tank into the sump tank compartment. The holes are sized according to the fuel pump capacity of the dedicated engine.

As the main fuel tank compartment is filled with fuel, the fuel flows to the sump tank compartment by gravity feed through the holes in the cover plate of the sump tank compartment. After filling of the sump tank compartment, the main tank compartment of the fuel tank is filled. The level of fuel also rises in the interconnecting tube between the cover plate and the mounting plate as the main tank compartment fills because of an air vent hole located near the top of the interconnecting tube adjacent to the top mounting plate. The filling of the interconnecting tube with fuel provides additional fuel capacity for the sump tank compartment, since fuel housed in the interconnecting tube will flow by gravity into the sump tank compartment as fuel is drawn from the sump tank compartment.

A flexible or semi-flexible pickup tube is threaded into the top mounting plate located on top of the tank. The fuel pickup tube extends through the interconnecting tube and into the sump tank compartment and its free end is free to move inside the sump tank compartment as moved by the dynamic acceleration forces acting on the fuel pickup tube.

An engine fuel return line connected to the fuel tank by a fuel return nozzle, extending through the top mounting plate, dumps fuel back into the sump through the interconnecting tube. The directing of fuel returned from the engine to the sump tank compartment maximizes the amount of time that a marine vehicle can operate even when fuel in the main fuel tank compartment of the fuel tank is completely over to one side or the other or away from the sump tank compartment.

Accordingly, it is an object of the present invention to provide a sump tank compartment located extending from and below a bottom level of a main fuel tank compartment for holding a portion of a fuel supply in the sump tank compartment into which a flexible fuel pickup tube extends which freely moves inside the sump tank compartment as affected by the dynamic acceleration forces acting on a free end of the fuel pickup tube.

It is another object of the present invention to have a sump tank compartment interconnected with and located below a main fuel tank compartment having a mounting plate including a connection tube mounted on top of the cover plate through which a flexible fuel pickup tube extends from above the main fuel tank compartment of the fuel tank into the sump tank compartment and the cover plate including holes located in front of and behind the connection tube through which fuel may pass into the sump tank compartment.

It is still yet another object of the present invention to provide a sump tank compartment located extending from and below the bottom of a main fuel tank compartment to store fuel which is accessible by a flexible fuel pickup tube located within the sump tank compartment and extending out of the main fuel tank compartment and having an engine fuel return line dumping fuel into the sump tank compartment by passage through a connection tube which passes through the main fuel tank compartment.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
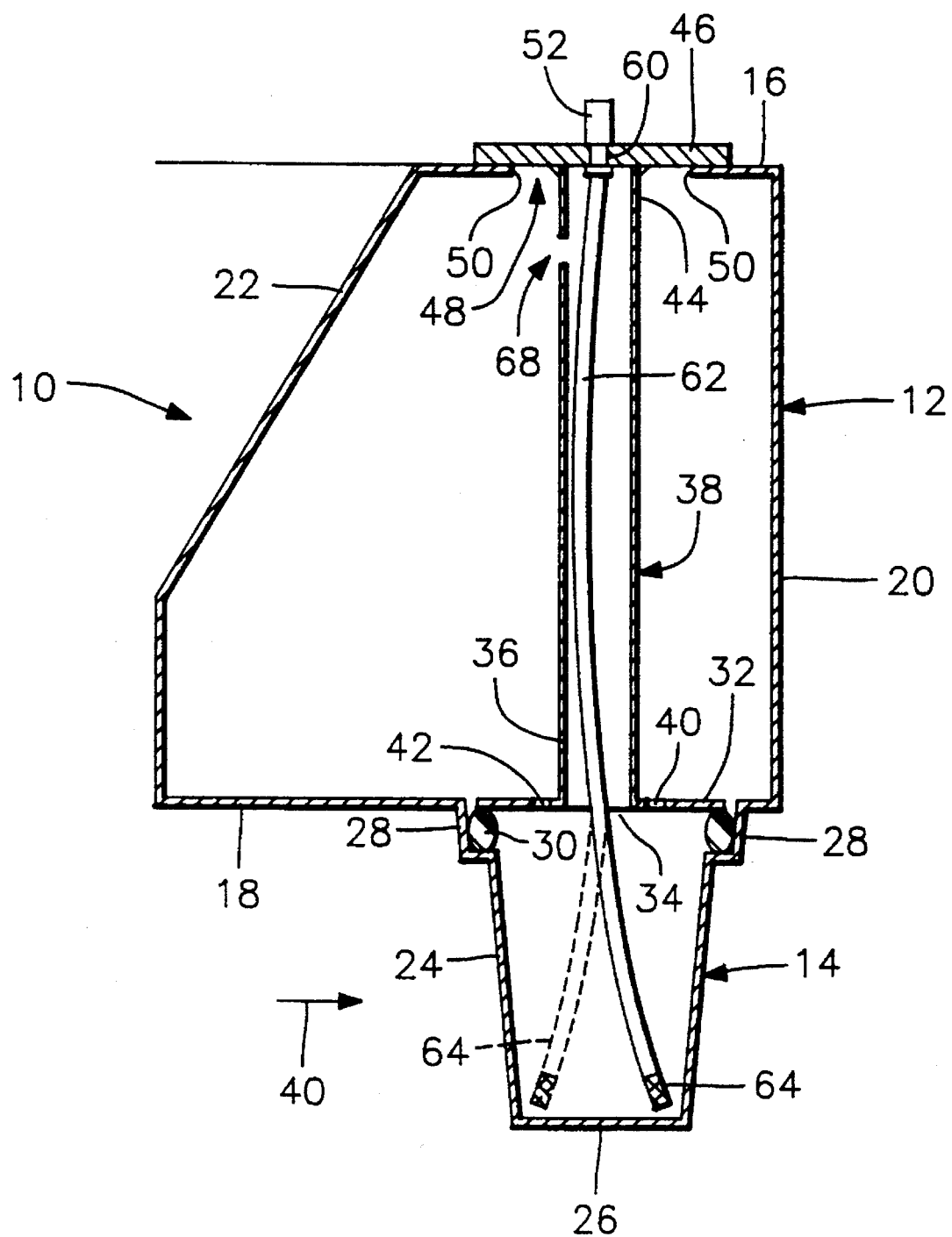
FIG. 1 is a sectional view of a fuel tank including a housing having a main fuel tank compartment and a sump tank compartment located below the main fuel tank compartment and an interconnecting tube extending through the main fuel tank compartment and opening up into the sump tank compartment through which a flexible fuel pickup tube extends into the sump tank compartment.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIG. 1 in particular, a marine fuel tank embodying the teachings of the subject invention is generally designated as 10. With reference to its orientation in FIG. 1, the marine fuel tank includes a housing having a main fuel tank compartment 12 and a sump tank compartment 14.

The main fuel tank compartment includes a top wall 16, bottom wall 18 and side walls 22. The sump tank compartment 14 includes a truncated cone-shaped side wall 24 and bottom wall 26. An uppermost portion 28 of the side wall 24 is stepped for receipt of an elastomeric O-ring seal 30. The uppermost portion 28 of the sump tank compartment is molded into the bottom wall 18 in a moldable marine fuel tank 10 and is secured to the bottom wall 18 in the case of a fabricated marine fuel tank made of, for example, aluminum.

The sump tank compartment 14 defines a circular opening through the bottom wall 18 of the main fuel tank compartment. Covering the opening in the bottom wall 18 leading to the sump tank compartment is a flat cover plate 32. The cover plate 32 preferably includes three openings. Within one opening 34 is secured one end 36 of a hollow interconnecting connection tube 38. The other two holes 40, 42 are positioned in front of (hole 40) and behind (hole 42) the interconnecting connection tube 38, in the direction of straight, forward travel, as indicated by arrow 40, of the marine craft into which the fuel tank of the present invention is installed.

The opposite end 44 of the interconnecting connection tube 38 is secured to a top mounting plate 46 which covers an elliptical-shaped opening 48 through the top wall 16 of the main fuel tank compartment as defined by edge 50 of the top wall 16. The top mounting plate 46 extends beyond the edge 50 of the opening 48.

Figure 2:
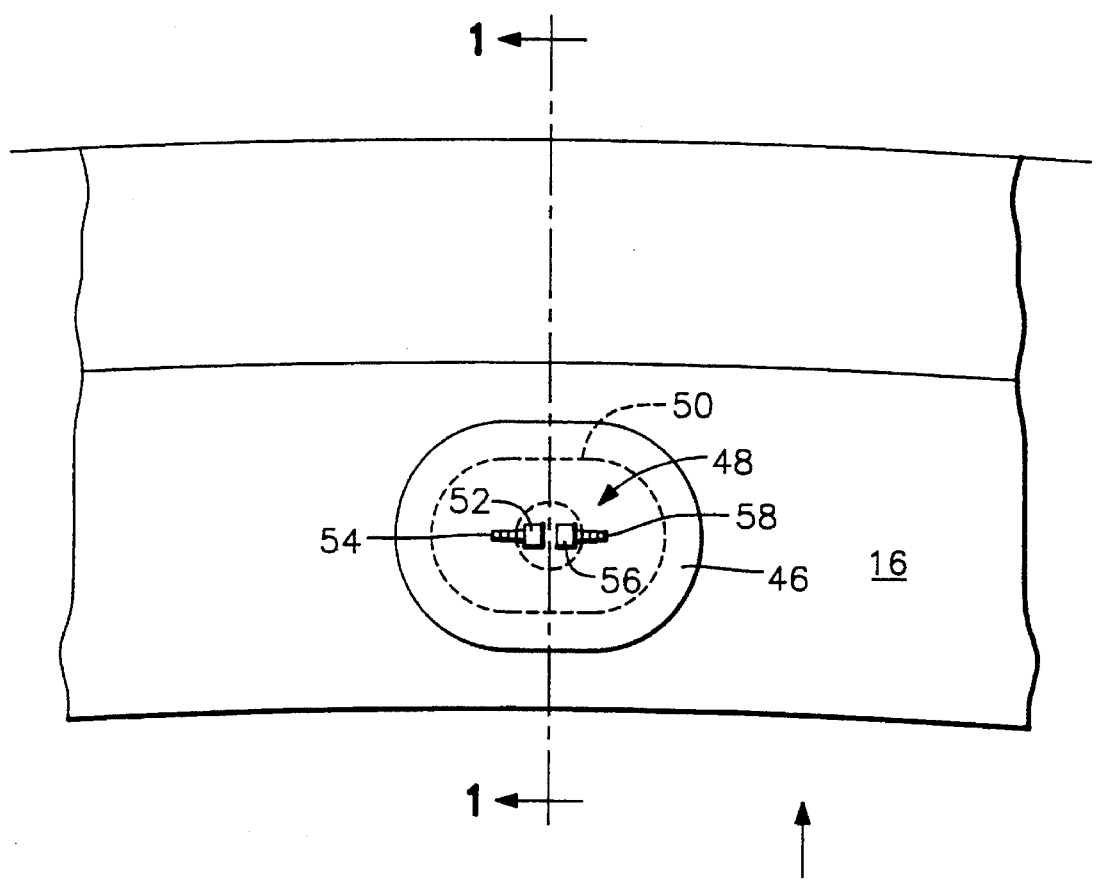
FIG. 2 is a top plan view of a mounting plate located on top of the fuel tank and including sectional line 1—1 indicative of the positioning of the cross-sectional view of FIG. 1.
Figure 3:
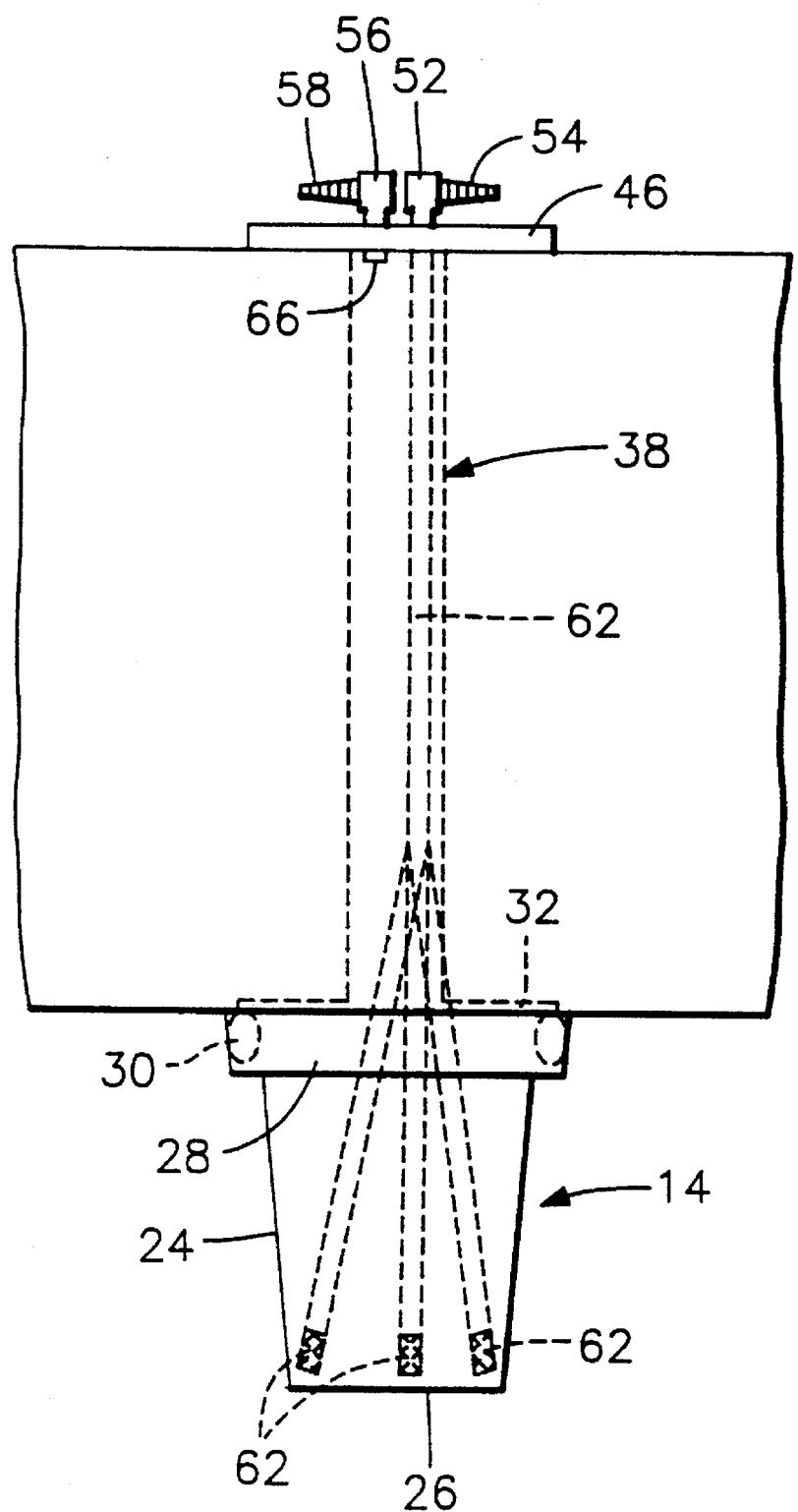
FIG. 3 is a side elevational view of the fuel tank of the present invention with the sump tank compartment shown extending below the bottom level of the main fuel tank compartment of the fuel tank.

As shown in FIGS. 2 and 3, a fuel pickup pipe 52 is threadingly engaged with an opening in the mounting plate 46 and is connected with a fuel pickup nozzle 54. In use, a hose (not shown) is clamped to the fuel pickup nozzle 54 to transfer fuel from the marine fuel tank 10 to a marine engine. Also, a fuel return pipe 56 extends through the mounting plate 46 and is connected with a fuel return nozzle 58 which is normally, in use, connected with a hose (not shown) clamped to the fuel return nozzle 58 for return of any unused portion of fuel from the marine engine to which the fuel pickup hose is also connected.

As shown in FIGS. 1 and 3, the fuel pickup pipe 52 is threaded into an opening 60 through the mounting plate 46. On the opposite side of the mounting plate 46 is connected a flexible or semi-flexible fuel pickup tube 62 connected to the fuel pickup pipe 52. The fuel pickup tube extends through the interconnecting connection tube 38, through the opening 34 in the cover plate 32 and terminates at an end 64 located adjacent to the bottom wall 26 of the sump tank compartment.

Similarly, the fuel return pipe 56 is threadingly engaged with an opening in the mounting plate 46. However, once extending through the mounting plate 46 at end 66 of the fuel return pipe 56, return fuel is dumped into the interconnecting connection tube 38 which conveys the return fuel directly into sump tank compartment 14 through opening 34 in the cover plate 32.

In use, fuel flowing into the main fuel tank compartment 12 through a fill inlet (not shown), gathers at the bottom of the main fuel tank compartment and a portion of the fuel flows through holes 40 and 42 until the sump tank compartment 14 is filled. As the main fuel tank compartment is continued to be filled, and the sump tank compartment 14 is full, fuel fills interconnecting connection tube 38 so as to fill the interconnecting connection tube 38 to the same level of fuel as in the main fuel tank compartment 12 due to the forcing of air from the interconnecting tube through air outlet opening 68.

During travel, even when the dynamic acceleration forces of the marine vehicle cause the fuel in the main fuel tank compartment to move away from the holes 40, 42 in the cover plate 32, fuel is prevented from sloshing out of the sump tank compartment through the holes 40, 42. Most sloshing of fuel occurs in a side-to-side direction rather than the direction of travel 40 of the marine vehicle in which the holes 40 and 42 are aligned and therefore fuel is prevented from leaving the sump tank compartment.

In addition, as shown in dotted lines in FIGS. 1 and 3, due to the flexible or semi-flexible nature of the fuel pickup tube 62, the end 64 of the fuel pickup tube may move in various directions according to the acceleration forces acting upon the end 64 of the fuel pickup tube. Therefore, for example in FIG. 1, when fuel is forced to the rear of the sump tank compartment 14, the end 64 of the pickup tube will similarly be forced to the same location as the fuel in the sump tank compartment so as to always be submerged in fuel, whether the acceleration forces on the fuel are towards the front of the tank, rear of the tank or side-to-side with respect to the sump tank compartment.

Further, fuel returning to the fuel tank by the fuel return pipe 56 is deposited into the sump tank compartment 14 through the interconnecting tube 38. This provides a supplement to fuel retained in the sump tank compartment when the position of fuel in the main fuel tank compartment 12 is such that the acceleration forces prevent refilling of the sump tank compartment through the holes 40, 42 of the cover plate 32.

Having described the invention, many modifications thereto will become apparent to those skilled in the art to which it pertains without deviation from the spirit of the invention as defined by the scope of the appended claims.

I claim:

1. A fuel tank comprising:
   a housing in a marine vehicle, said housing including a main tank compartment and a sump tank compartment extending from a bottom wall of said main tank compartment for flow of fuel by gravity from said main tank compartment into said sump tank compartment, and a flexible fuel pickup tube extending into said sump tank compartment for removing fuel from said sump tank compartment and for moving as a result of acceleration forces acting on said housing.

2. A fuel tank as claimed in claim 1, wherein said flexible fuel pickup tube extends through said main tank compartment to said sump tank compartment.

3. A fuel tank as claimed in claim 2, wherein said flexible fuel pickup tube extends through a connection tube interconnecting a top wall of said main tank compartment and a common wall shared by said bottom wall of said main tank compartment and a top wall of said sump tank compartment.

4. A fuel tank as claimed in claim 3, wherein said common wall includes two holes positioned on opposite sides of said connection tube.

5. A fuel tank as claimed in claim 4, wherein said two holes are aligned in a direction of travel of said housing.

6. A fuel tank as claimed in claim 3, wherein a fuel return line is in communication with said connection tube for disposal of returned fuel from an engine to said sump tank compartment.

7. A fuel tank as claimed in claim 6, wherein said connection tube includes an air inlet opening in said main tank compartment.

8. A fuel tank comprising:

a housing including a main tank compartment and a sump tank compartment extending from a bottom wall of said main tank compartment for flow of fuel by gravity from said main tank compartment into said sump tank compartment, and a flexible fuel pickup tube extending into said sump tank compartment for removing fuel from said sump tank compartment and for moving as a result of acceleration forces acting on said housing, said flexible fuel pickup tube extending through said main tank compartment to said sump tank compartment.

9. A fuel tank as claimed in claim 1, wherein said flexible fuel pickup tube extends through a connection tube interconnecting a top wall of said main tank compartment and a common wall shared by said bottom wall of said main tank compartment and a top wall of said sump tank compartment.

10. A fuel tank as claimed in claim 9, wherein said common wall includes two holes positioned on opposite sides of said connection tube.

11. A fuel tank as claimed in claim 10, wherein said two holes are aligned in a direction of travel of said housing.

12. A fuel tank as claimed in claim 9, wherein a fuel return line is in communication with said connection tube for disposal of returned fuel from an engine to said sump tank compartment.

13. A fuel tank as claimed in claim 12, wherein said connection tube includes an air inlet opening in said main tank compartment.

14. A marine fuel tank comprising:

a housing including a main tank compartment and a sump tank compartment extending from a bottom wall of said main tank compartment, said main tank compartment and said sump tank compartment communicating with each other for passage of fuel from said main tank compartment to sump tank compartment, cover plate means for sealing said sump tank compartment and for separating said main tank compartment and said sump tank compartment, and fuel pickup means extending into said sump tank compartment for removing fuel from said sump tank compartment, one end of said fuel pickup means moving as a result of acceleration forces acting on said housing while remaining submerged within fuel in said sump tank compartment.

15. A marine fuel tank as claimed in claim 14, wherein said fuel pickup means extends through said cover plate means.

16. A marine fuel tank as claimed in claim 14, wherein said fuel pickup means extends through a connection tube having one end communicating with said sump tank compartment through said cover plate means and an opposite end connected to a top wall of said main tank compartment with said fuel pickup means extending through said top wall.

17. A marine fuel tank as claimed in claim 14, wherein said cover plate means includes at least one hole for allowing passage of fuel from said main tank compartment to said sump tank compartment.

18. A marine fuel tank as claimed in claim 16, wherein fuel return means for return of fuel to said sump tank compartment is in communication with said connection tube.

19. A fuel tank as claimed in claim 18, wherein said connection tube includes an air inlet opening in said main tank compartment.

* * * * *